(12) United States Patent
Wu et al.

(10) Patent No.: US 6,960,901 B2
(45) Date of Patent: Nov. 1, 2005

(54) BI-DIRECTIONAL DC/DC POWER CONVERTER HAVING A NEUTRAL TERMINAL

(75) Inventors: Chin-Chang Wu, Kaohsiung (TW); Hung-Liang Chou, Kaohsiung (TW); Ya-Tsung Feng, Kaohsiung (TW); Chi-Nan Hsieh, Kaohsiung (TW); Yao-Jen Chang, Kaohsiung (TW)

(73) Assignee: UIS Abler Electronics Co., Ltd., Hsintien (TW)

( * ) Notice: Subject to any disclaimer, the term of this patent is extended or adjusted under 35 U.S.C. 154(b) by 29 days.

(21) Appl. No.: 10/802,936

(22) Filed: Mar. 18, 2004

(65) Prior Publication Data

US 2004/0222776 A1 Nov. 11, 2004

(30) Foreign Application Priority Data

May 7, 2003 (TW) ................................. 92112475 A

(51) Int. Cl.[7] .............................................. G05F 1/10
(52) U.S. Cl. ....................... 323/222; 323/282; 323/224; 323/225
(58) Field of Search ................................ 323/222, 282, 323/224, 225, 284

(56) References Cited

U.S. PATENT DOCUMENTS 6,051,961 A * 4/2000 Jang et al. ................... 323/224

* cited by examiner

*Primary Examiner*—Shawn Riley
(74) *Attorney, Agent, or Firm*—Bacon & Thomas PLLC

(57) ABSTRACT

A bi-directional dc/dc power converter having a neutral terminal includes a first dc voltage terminal set and a second dc voltage terminal set. When the direction of power flow is from the first dc voltage terminal set to the second dc voltage terminal set, the Output voltage of power converter is the double of the input dc voltage. When the power flow direction is in reverse from the second dc voltage terminal set to the first dc voltage terminal set, the output voltage of power converter is half of the input dc voltage in this power flow direction.

8 Claims, 4 Drawing Sheets

BI-DIRECTIONAL DC/DC POWER CONVERTER HAVING A NEUTRAL TERMINAL

BACKGROUND OF THE INVENTION

1. Field of the Invention

The present invention is related to a bi-directional dc/dc power converter having a neutral terminal. More particularly, the present invention is related to the bi-directional dc/dc power converter for bi-directional power flow. When the power converter acts as a step-up power converter, the power flow direction is from the low voltage to the high voltage, and two dc voltages with the same amplitude are serially connected to the neutral terminal to provide a double voltage at the output of the second voltage terminal set. When the power converter acts as a step-down power converter, the power flow direction of the power converter is inverted, and the power flow direction is from the high voltage to the low voltage. The output voltage at the first voltage terminal set is half of the voltage at the second voltage terminal set.

2. Description of the Related Art

Referring to FIG. 1, a conventional DC/DC power converter circuit comprises a DC/DC step-up power converter 1. The DC/DC step-up power converter 1 includes an input terminal 11, a power electronic device 12, an output terminals 13, an inductor 14, a diode 15 and a capacitor 16. As an input dc voltage is applied to the input terminal 11, the input dc voltage provides energy to the inductor 14 during the interval when the power electronic device 12 is turned on. During the interval when the power electronic device 12 is turned off, the inductor current transfers its stored energy to the capacitor 16 via the diode 15 so that the capacitor 16 may provide with an output dc voltage larger than that of the input dc voltage for the output terminals 13. Generally, the output terminals 13 of the DC/DC step-up power converter 1 has only two output points and no neutral terminal that is used to connect two dc voltages with the same amplitude in series to provide a double voltage. Accordingly, the DC/DC step-up power converter 1 only allows unidirectional power flow. However, in many applications, the DC/DC step-up power converter 1 requires a neutral terminal at its output terminals and bi-directional power flow direction.

For example, a single-phase half-bridge inverter must employ a neutral terminal at its dc side. The DC/DC step-up power converter 1 is used to supply a dc voltage that is double of the voltage across two dc capacitors of the single-phase half-bridge inverter. However, there is no neutral terminal in the output terminals of the step-up DC/DC power converter 1. Thus, the step-up DC/DC power converter 1 cannot supplies two dc voltages with the same amplitude for the single-phase half-bridge inverter. If the amplitude of both dc capacitor voltages is not equal, the performance of single-phase half-bridge inverter will be degraded. Additionally, the power flow in the step-up DC/DC power converter 1 is unidirectional. However, bi-directional power flow is required in many applications of the half-bridge inverter, such as the single-phase parallel operation uninterruptible power supply (UPS) configured by the half-bridge converter. In this UPS circuit topology, it only uses a half-bridge inverter to convert the power from ac to dc for charging the power into the battery and supplying the dc power of UPS for converting the power from dc to ac to the load. The bi-directional power flow is required in the DC/DC power converter according the power flow of half-bridge inverter for charging the battery and regulating the dc voltage of the half-bridge inverter.

Another example, a three-phase four-wire inverter with a leg consisting of two separated dc capacitors also desires a DC/DC power converter with a neutral terminal at the output terminals to supply two dc voltages with the same amplitude for normal operation. Moreover, the bi-directional power flow for DC/DC converter is also required in the three-phase four-wire parallel operation UPS. Hence, the DC/DC step-up power converter 1 cannot satisfy the requirement in this UPS circuit topology that uses the three-phase four-wire inverter with a leg consisting of two separated dc capacitors.

The above description indicates that the DC/DC step-up power converter 1 fails to provide with a neutral terminal at its output terminals and cannot supply two dc voltages with the same amplitude. Besides, it cannot carry out the bi-directional power flow direction. Consequently, the application of the DC/DC step-up power converter 1 is limited.

The present invention intends to provide a bi-directional dc/dc power converter having a neutral terminal and carrying out bi-directional power flow. When the power converter acts as a step-up power converter, the power flow direction is from the low voltage to the high voltage, and two dc voltages with the same amplitude are serially connected to the neutral terminal to provide a double voltage at the output of the second voltage terminal set. When the power converter acts as a step-down power converter, the power flow direction of the power converter is inverted, and the power flow direction is from the high voltage to the low voltage. The output voltage at the first voltage terminal set is half of the voltage at the second voltage terminal set.

SUMMARY OF THE INVENTION

The primary objective of this invention is to provide a bi-directional dc/dc power converter comprises a first dc voltage terminal set acting as the input or the output end, and a second dc voltage terminal set acting as another input or another output end for bi-directional power flow. In the first power flow direction, the power converter acts as a step-up power converter, the power flow direction is from the low voltage to the high voltage, and two dc voltages with the same amplitude are serially connected to the neutral terminal to provide a double voltage at the output of the second voltage terminal set. When the power converter provides a double voltage at the output of the second voltage terminal set, the input voltage is directly incorporated into the output voltage to increase efficiency in addition to providing with the neutral terminal. In the second power flow direction, the power converter acts as a step-down power converter, the power flow direction of the power converter is inverted, and the power flow direction is from the high voltage to the low voltage. The output voltage at the first voltage terminal set is half of the voltage at the second voltage terminal set.

A bi-directional dc/dc power converter having a neutral terminal in accordance with the present invention includes a first dc voltage terminal set and a second dc voltage terminal set. The first dc voltage terminal set has a positive terminal and a negative terminal, and the second dc voltage terminal set has a positive terminal, a negative terminal and a neutral terminal. The bi-directional dc/dc power converter further includes an inductor, a first power electronic device, a second power electronic device, a first diode, a second diode, a capacitor and a controller. The inductor and the first power electronic device are connected in series between the positive terminal and negative terminal of the first dc voltage terminal set. The second power electronic device is connected between the positive terminal of the second dc voltage terminal set and the connection point of the inductor and the first power electronic device. Each of the first diode and the second diode is connected parallel corresponding to the first power electronic device and the second power electronic device. The capacitor is connected between the two positive terminals of the first dc voltage terminal set and the second dc voltage terminal set. The neutral terminal of the second dc voltage terminal set is connected to the positive terminal of the first dc voltage terminal set. The negative terminal of the second dc voltage terminal set is directly connected to the negative terminal of the first dc voltage terminal set. The controller is connected to the first power electronic device and the second power electronic device for turning on/off.

The bi-directional dc/dc power converter of the present invention accomplishes bi-directional power flow direction. When the power flow direction is from the first dc voltage terminal set to the second dc voltage terminal set, the output voltage of the bi-directional dc/dc power converter is controlled to be the double of the input voltage. Alternatively, when the power flow direction is in reverse from the second dc voltage terminal set to the first dc voltage terminal set, the output voltage of the bi-directional dc/dc power converter is controlled to be half of the input voltage. When the power flow direction is from the first dc voltage terminal set to the second dc voltage terminal set, a dc voltage source is applied to the first dc voltage terminal set and an output voltage is produced in the second dc voltage terminal set. In this condition, the first power electronic device is turned on/off, and the second power electronic device is not actuated to successively turn off. Owing to turning on/off the first power electronic device, the inductor is energized by the input dc voltage source from the first dc voltage terminal set and then releases the energy to the capacitor via the second diode. Thus, the capacitor is able to provide a converted output dc voltage that is equal to the input dc voltage. Since the voltage between the positive and negative terminals of the second dc voltage terminal set is equal to the input dc voltage plus the converted output dc voltage, the output voltage of the bi-directional dc/dc power converter is controlled to be the double of the input dc voltage. Also, the voltage of the neutral terminal of the second dc voltage terminal set is equal to the half voltage between the positive and negative terminals of the second dc voltage terminal set. Consequently, the voltage rating of the dc capacitor is only half of the voltage between the positive and negative terminals of the second dc voltage terminal set. The present invention accomplishes a double output voltage in this power flow direction.

When the power flow direction is from the second dc voltage terminal set to the first dc voltage terminal set, the second power electronic device is turned on/off, and the first power electronic device is not actuated to successively turn off. In this condition, the first dc voltage terminal set provides a half of the input dc voltage of the second dc voltage terminal set. Consequently, the present invention accomplishes a half output voltage in this reverse power flow direction.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
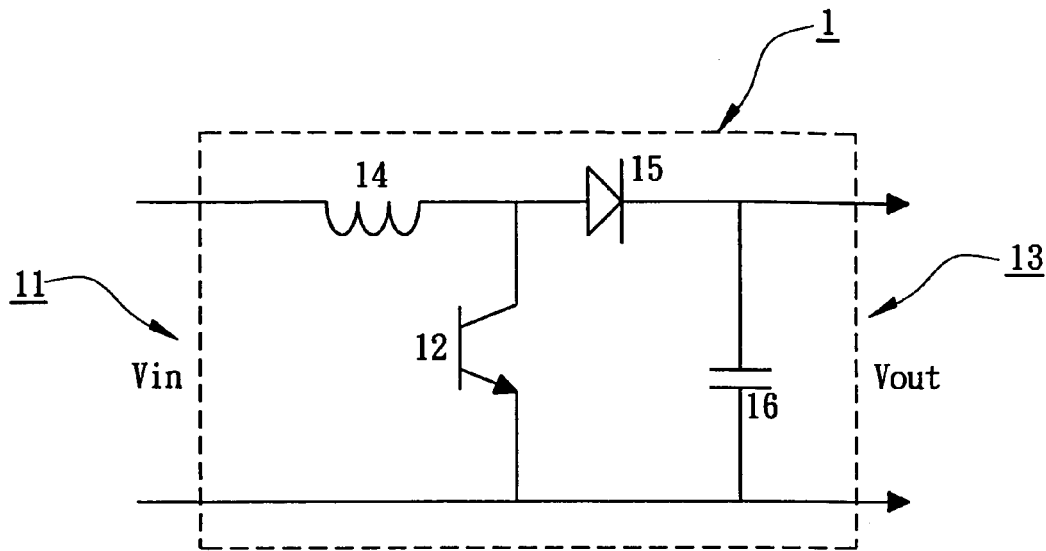
FIG. 1 is a schematic circuitry of a conventional DC/DC power converter circuit in accordance with the prior art.
Figure 2:
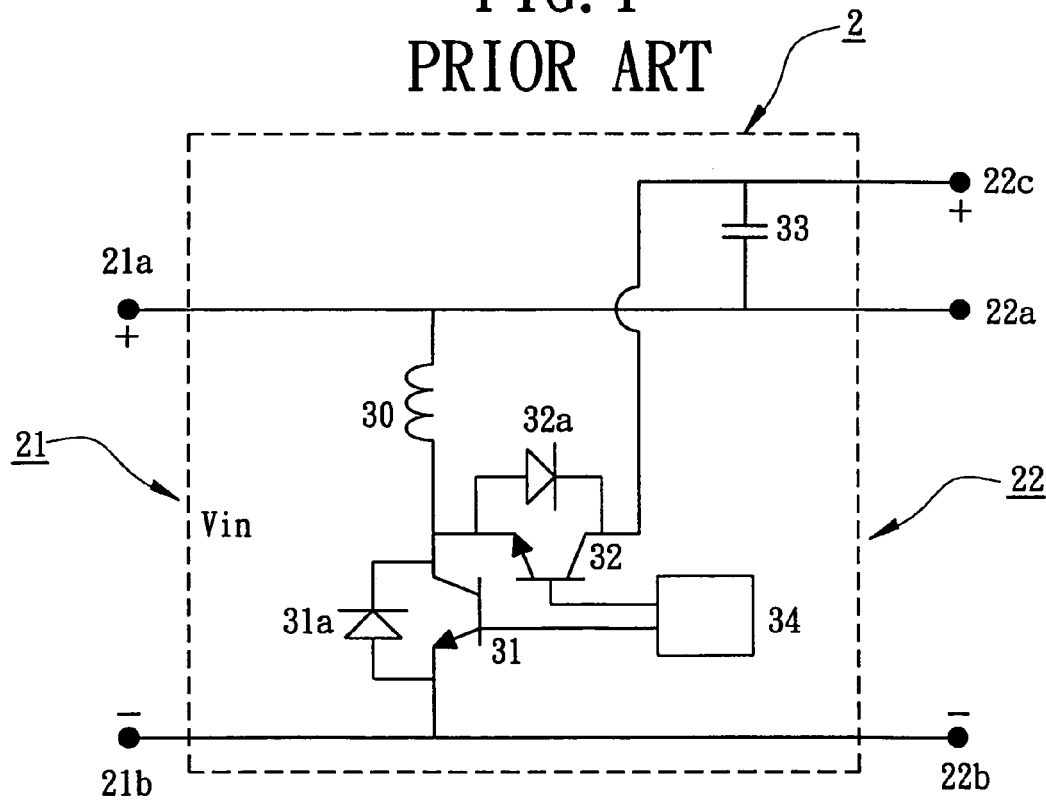
FIG. 2 is a schematic circuitry of a bi-directional dc/dc power converter having a neutral terminal in accordance with a preferred embodiment of the present invention.

Referring initially to FIG. 2, it illustrates a bi-directional dc/dc power converter 2 having a neutral terminal in accordance with the preferred embodiment of the present invention.

Referring to FIG. 2, the bi-directional dc/dc power converter 2 includes a first dc voltage terminal set 21 and a second dc voltage terminal set 22. The first dc voltage terminal set 21 has a positive terminal 21a and a negative terminal 21b, and the second dc voltage terminal set has a positive terminal 22c, a negative terminal 22b and a neutral terminal 22a. The bi-directional dc/dc power converter 2 further includes an inductor 30, a first power electronic device 31, a second power electronic device 32, a first diode 31a, a second diode 32a, a capacitor 33 and a controller 34. The inductor 30 and the first power electronic device 31 are connected in series between the positive terminal 21a and negative terminal 21b of the first dc voltage terminal set 21. The second power electronic device 32 is connected to a connection point between the inductor 30 and the first power electronic device 31, and the positive terminal 22c of the second dc voltage terminal set 22. The first diode 31a and the second diode 32a are connected parallel corresponding to the first power electronic device 31 and the second power electronic device 32. The capacitor 33 is connected between the two positive terminals 21a, 22c of the first dc voltage terminal set 21 and the second dc voltage terminal set 22. The neutral terminal 22a of the second dc voltage terminal set 22 is directly connected to the positive terminal 21a of the first dc voltage terminal set 21. The negative terminal 22b of the second dc voltage terminal set 22 is directly connected to the negative terminal 21b of the first dc voltage terminal set 21. The controller 34 is connected to the first power electronic device 31 and the second power electronic device 32 for turning on/off.

Referring again to FIG. 2, the bi-directional dc/dc power converter 2 accomplishes bi-directional power flow. Thus, the power flow direction is from the first dc voltage terminal set 21 to the second dc voltage terminal set 22 and, alternatively, transmitted in reverse from the second dc voltage terminal set 22 to the first dc voltage terminal set 21.

When the power flow direction is from the first dc voltage terminal set 21 to the second dc voltage terminal set 22, a dc voltage source is applied to the first dc voltage terminal set 21 and converted into the second dc voltage terminal set 22. In this condition, the controller 34 controls the first power electronic device 31 to turn on/off, and the second power electronic device 32 is successively turned off. Owing to turning on/off the first power electronic device 31, the inductor 30 is energized by the input dc voltage source from the first dc voltage terminal set 21 and then releases the energy to the capacitor 33 via the second diode 32a. Thus, the capacitor 33 is able to provide an output dc voltage equivalent to the input dc voltage. Since the voltage between the positive and negative terminals 22c, 22b of the second dc voltage terminal set 22 are equal to the input dc voltage plus the converted output dc voltage, the output voltage of bi-directional dc/dc power converter 2 is double of the input dc voltage. Also, the voltage of the neutral terminal 22a of the second dc voltage terminal set 22 is half of the second dc voltage terminal set 22. Consequently, the voltage rating of the capacitor 33 is half of the voltage at the second dc voltage terminal set 22. The present invention accomplishes a double output voltage with a neutral terminal in this power flow direction.

When the power flow direction is in reverse from the second dc voltage terminal set 22 to the first dc voltage terminal set 21, a dc voltage source is applied to the second dc voltage terminal set 22 and converted to a output voltage at the first dc voltage terminal set 21. In this condition, the controller 34 controls the second power electronic device 32 to turn on/off, and the first power electronic device 31 is successively turned off. Thus, the output voltage of the first dc voltage terminal set 21 is controlled to be half of the input dc voltage at the second dc voltage terminal set 22. Consequently, the present invention accomplishes a half output voltage in this reverse power flow direction.

Figure 3:
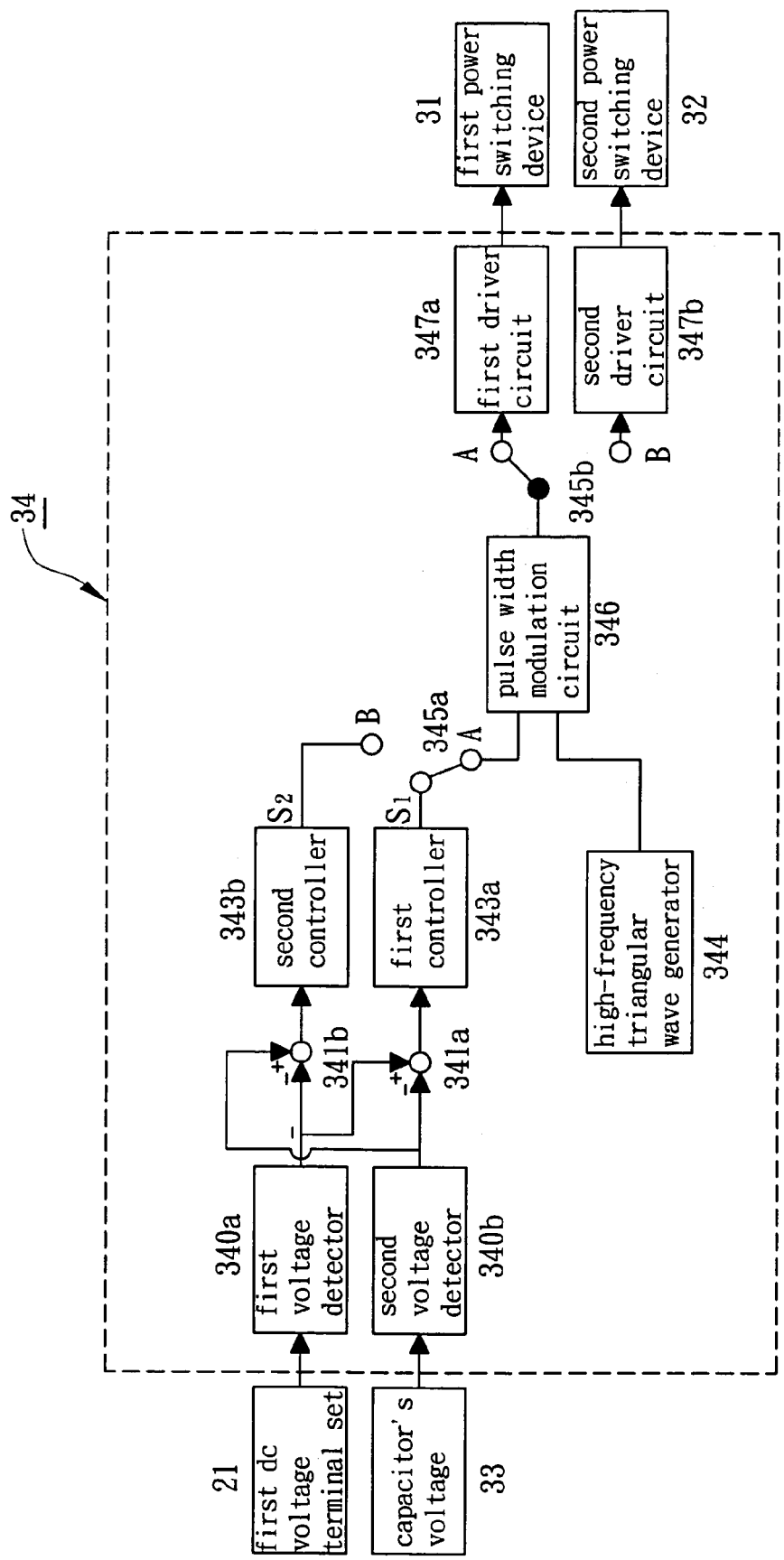
FIG. 3 is a block diagram of a controller of the bi-directional dc/dc power converter in accordance with the preferred embodiment of the present invention.

Turning now to FIG. 3, it illustrates a block diagram of the controller 34 of the bi-directional dc/dc power converter 2 in accordance with the preferred embodiment of the present invention.

Referring to FIG. 3, the controller 34 of the bi-directional dc/dc power converter 2 includes a first voltage detector 340a, a second voltage detector 340b, a first subtractor 341a, a second subtractor 341b, a first controller 343a, a second controller 343b, a high-frequency triangular wave generator 344, a first switch 345a, a second switch 345b, a pulse width modulation circuit 346, a first driver circuit 347a and a second driver circuit 347b.

Referring back to FIGS. 2 and 3, the controller 34 detects the voltages of the first dc voltage terminal set 21 and the capacitor 33 for turning on/off the first power electronic device 31 and the second power electronic device 32. Therefore, the bi-directional dc/dc power converter 2 is able to control the power flow direction. Consequently, the power flow direction is from the first dc voltage terminal set 21 to the second dc voltage terminal set 22, and in reverse from the second dc voltage terminal set 22 to the first dc voltage terminal set 21.

Referring again to FIGS. 2 and 3, when the power flow direction is from the first dc voltage terminal set 21 to the second dc voltage terminal set 22, the bi-directional dc/dc power converter 2 is able to provide a voltage that is double of the voltage at the first dc voltage terminal set 21 to the second dc voltage terminal set 22. In this condition, the first power electronic device 31 is controlling to turn on/off, and the second power electronic device 32 is successively turned off so that the first switch 345a and the second switch 345b are commonly in position "A". The first voltage detector 340a is used to detect the voltage of the first dc voltage terminal set 21, and the output voltage of the first voltage detector 340a is regarded as a reference signal. Meanwhile, the second voltage detector 340b is used to detect the voltage of the capacitor 33. Then, the reference signal and the voltage of the capacitor 33 are sent to the first subtractor 341a. Subsequently, the output of the first subtractor 341a is sent to the first controller 343a to obtain a first control signal S1. The high-frequency triangular wave generator 344 is used to generate a high-frequency triangular wave signal and send to the pulse width modulation circuit 346. The generated triangular wave signal acts as a carrier signal. Since the first switch 345a is in position "A," the first control signal S1 is sent to the pulse width modulation circuit 346 for modulation and to generate a PWM signal. Furthermore, since the second switch 345b is also in position "A," the PWM signal generated by the pulse width modulation circuit 346 is sent to the first driver circuit 347a to generate a driving signal to turn on/off the first power electronic device 31.

Referring again to FIGS. 2 and 3, when the first power electronic device 31 is turned on, the inductor 30 is energized. Alternatively, when the first power electronic device 31 is turned off, the inductor 30 releases the energy via the second diode 32a to the capacitor 30. In order to control the voltage of the capacitor 33 to be equal to that of the first dc voltage terminal set 21, the voltage of the capacitor 33 is detected and sends to the controller 34 to act as a feedback signal of the close-loop control to compare with the reference signal of the detected voltage of the first dc voltage terminal set 22. Then, the voltage of the capacitor 33 is controlled to be equal to that of the first dc voltage terminal set 21. Since the capacitor 33 is connected between the positive terminals 21a, 22c of the first dc voltage terminal set 21 and the second dc voltage terminal set 22, the total voltage of the positive and negative terminals 22c, 22b of the second dc voltage terminal set 22 is equal to the voltage of the dc voltage source plus the voltage of capacitor 33. Therefore, the total voltage of the positive and negative terminals 22c, 22b of the second dc voltage terminal set 22 is equal to the double voltage of the input voltage of the first dc voltage terminal set 21. Thus, the power converter constitutes a double voltage circuit. Meanwhile, since the positive terminal 21a of the first dc voltage terminal set 21 is further connected to the neutral terminal 22a of the second dc voltage terminal set 22, the neutral terminal 22a of the second dc voltage terminal set 22 acts as the neutral terminal of the voltage of the second dc voltage terminal set 22. Consequently, the bi-directional dc/dc power converter 2 generates a double output voltage as the power flow direction is from the first dc voltage terminal set 21 to the second dc voltage terminal set 22, and provides with the neutral terminal 22a. The neutral terminal 22a of the bi-directional dc/dc power converter 2 is available for the electronic apparatus with the requirement of a neutral terminal.

Referring again to FIGS. 2 and 3, when the power flow direction is in reverse from the second dc voltage terminal set 22 to the first dc voltage terminal set 21, the bi-directional dc/dc power converter 2 is able to provides a half output voltage at the first dc voltage terminal set 21. In this condition, the second power electronic device 32 is controlled to turn on/off, and the first power electronic device 31 is successively turned off so that the first switch 345a and the second switch 345b are commonly in position "B". Similarly, the first voltage detector 340a is used to detect the voltage of the first dc voltage terminal set 21; and the second voltage detector 340b used to detect the voltage of the capacitor 33 which is regarded as a reference signal. Then, the outputs of the first voltage detector 340a and the second voltage detector 340b are sent to the second subtractor 341b; and, subsequently, the output of the second subtractor 341b is sent to the second controller 343b to obtain a second control signal S2. The high-frequency triangular wave generator 344 is used to generate a high-frequency triangular wave signal that is sent to the pulse width modulation circuit 346 and acts as a carrier signal. Since the first switch 345a is in position "B," the second control signal S2 is sent to the pulse width modulation circuit 346 for modulation and generating a PWM signal. Furthermore, since the second switch 345b is also in position "B," the PWM signal generated by the pulse width modulation circuit 346 is sent to the second driver circuit 347b to generate a driving signal to turn on/off the second power electronic device 32.

Referring again to FIGS. 2 and 3, the second power electronic device 32 is repeatedly turned on and off, and the first power electronic device 31 is successively turned off. The inductor 30 is used to filter output the square wave voltage caused by the switching operation of the first power electronic device 31. Then, the output voltage of the first dc voltage terminal set 21 is controlled to be equal to half of the voltage at the positive and negative terminals 22c, 22b of the second dc voltage terminal set 22. According to various applications, the first dc voltage terminal set 21 connects with a capacitor or a battery. The first dc voltage terminal set 21 is able to supply a stable dc voltage that is equal to the half voltage of the second dc voltage terminal set 22. Consequently, the output voltage of bi-directional dc/dc power converter 2 at the first dc voltage terminal set 21 is half of the voltage at the second dc voltage terminal set 22 in this power flow direction.

Figure 4:
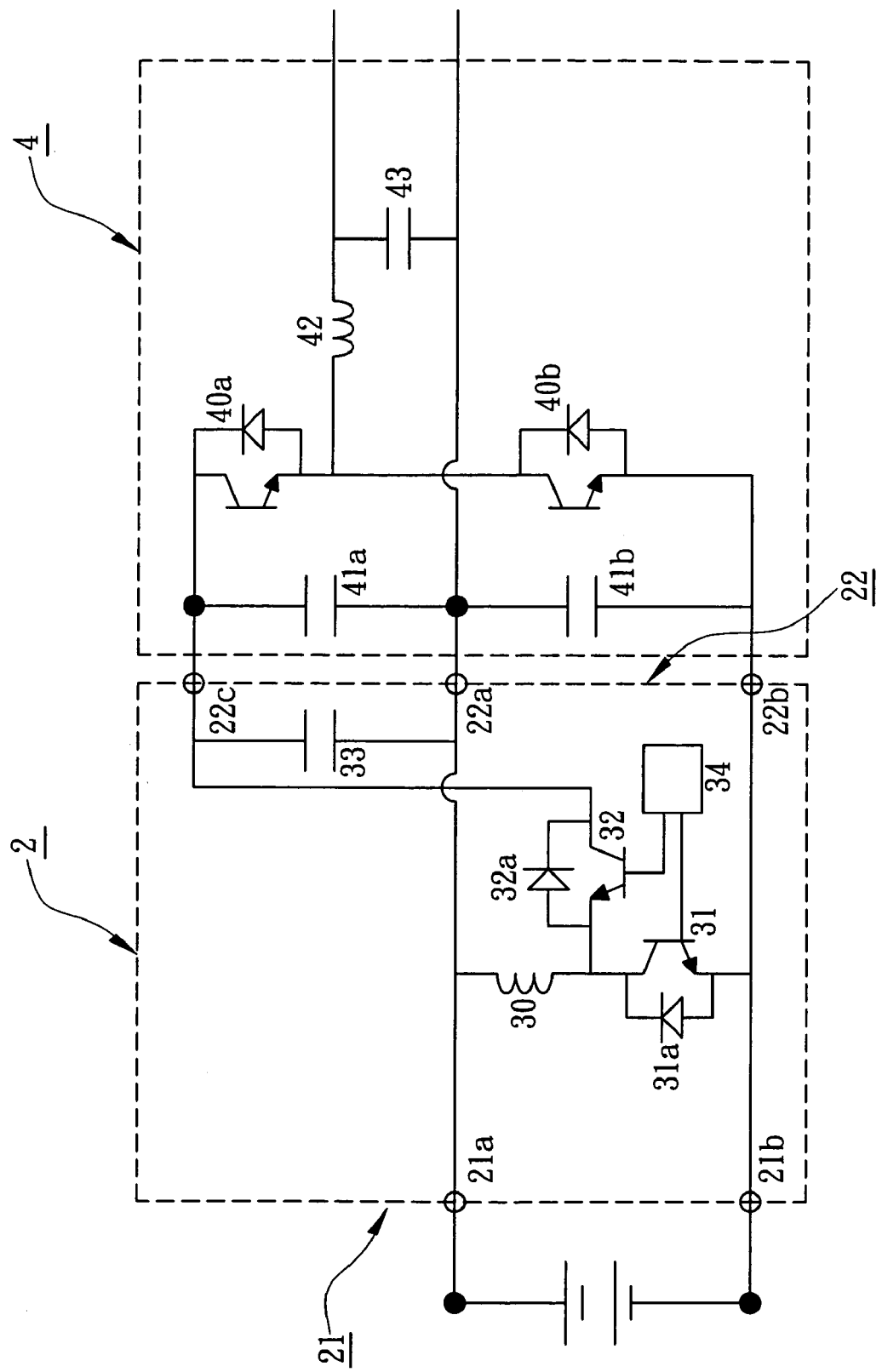
FIG. 4 is a schematic circuitry of the bi-directional dc/dc power converter applied to a single-phase half-bridge inverter in accordance with the preferred embodiment of the present invention.

Turning now to FIG. 4, it illustrates a schematic circuitry of the bi-directional dc/dc power converter applied to a single-phase half-bridge inverter to act as a parallel operation UPS in accordance with the preferred embodiment of the present invention.

Referring now to FIG. 4, the single-phase half-bridge inverter 4 includes two legs consisting of a first leg and a second leg. The first leg and the second leg are connected in parallel, and then connected in parallel to the dc side of the single-phase half-bridge inverter 4. The first leg consists of a pair of power switching devices 40a and 40b while the second leg consisting of a pair of capacitors 41a and 41b. The middle points of these two legs further include a L-C low-pass filter consisting of an inductor 42 and a capacitor 43 to provide an ac end of the single-phase half-bridge inverter 4. The power flow of the single-phase half-bridge inverter 4 is bi-directional. The dc end of the single-phase half-bridge inverter 4 is connected to the second voltage terminal set 22 of the bi-directional dc/dc converter 2. The first voltage terminal set 21 of the bi-directional dc/dc converter 2 is connected to a battery bank. The ac end of the single-phase half-bridge inverter 4 is connected between an ac voltage source and a load. When the ac voltage source is failed, the power flow direction is from the dc end to the ac end of single-phase half-bridge inverter 4 to provide buck-up power to the load. On the contrary, the power flow direction is from the ac end to the dc end to charge the power to the battery when the ac voltage source is normal.

Referring again to FIGS. 3 and 4, when the ac voltage source is failed, the power flow direction is from the dc end to the ac end of the single-phase half-bridge inverter 4. The single-phase half-bridge inverter 4 converts a dc voltage into an ac voltage by turning on/off the power switching devices 40a and 40b. The input voltage is converted into the output voltage via the inductor 42 and the capacitor 43 for filtering out harmonic caused by the switching operation. Then, the output ac voltage is applied to the load. In this condition, the voltages of the two capacitors 41a and 41b in the single-phase half-bridge inverter 4 are expected to be the same. Otherwise, the un-equal voltage amplitude of the two capacitors 41a and 41b may affect the normal operation of the single-phase half-bridge inverter 4. In conventional applications, different capacitance in the two capacitors 41a and 41b, asymmetry waveform of the ac load or the transient operation of the single-phase half-bridge inverter 4 may result in unbalance voltages at the two capacitors 41a and 41b. In order to maintain the voltages of the two capacitors 41a and 41b to be the same, an additional voltage-balanced circuit must be added in the conventional design. However, the second dc voltage terminal set 22 of the bi-directional dc/dc power converter 2 includes the positive terminal 22c, the negative terminal 22b and the neutral terminal 22a, and provides with two voltages with the same amplitude. Hence, the second dc voltage terminal set 22 of the bi-directional dc/dc power converter 2 is employed to supply the two capacitors 41a and 41b with the same dc voltage in the single-phase half-bridge inverter 4. Consequently, the single-phase half-bridge inverter 4 can omit an additional voltage-balanced circuit method.

Referring again to FIGS. 3 and 4, when the bi-directional dc/dc power converter 2 is applied to the single-phase half-bridge inverter 4, the first dc voltage terminal set 21 of the bi-directional dc/dc power converter 2 is connected to the battery. The positive terminal 22c, the negative terminal 22b and the neutral terminal 22a of the second dc voltage terminal set 22 of the bi-directional dc/dc power converter 2 are correspondingly connected to the two capacitors 41a and 41b of the single-phase half bridge inverter 4. The operation of the bi-directional dc/dc power converter 2 in accordance with the preferred embodiment of the present invention, as shown in FIG. 4, has been discussed in FIGS. 2 and 3, and the detailed descriptions may be omitted. The capacitor 33 of the bi-directional dc/dc power converter 2 can be incorporated into the capacitor 41a of the single-phase half bridge inverter 4 to constitute a single capacitor.

When ac voltage source is failed, the power flow direction of the bi-directional dc/dc converter is from the first dc voltage terminal set 21 to the second dc voltage terminal set 22, the first power electronic device 31 is controlled to turn on/off, and the second power electronic device 32 is successively turned off. When the first power electronic device 31 is controlled to turn on/off, the inductor 30 is energized by the first dc voltage terminal set 21 and then releases the energy via the second diode 32a to the capacitor 33 to provide a voltage thereon. Since the total voltage of the positive and negative terminals 22c, 22b of the second dc voltage terminal set 22 is equal to a voltage of the power source plus the voltage of capacitor 33, the total voltage of the positive and negative terminals 22c, 22b of the second dc voltage terminal set 22 is equal to the double voltage of the dc voltage source. Then, the neutral terminal 22a of the second dc voltage terminal set 22 divides the voltage of the positive and negative terminals 22c, 22b of the second dc voltage terminal set 22 into two dc voltages with the same amplitude. Consequently, the bi-directional dc/dc power converter 2 supplies with two dc voltages with the same amplitude to the single-phase half-bridge inverter 4 for normal operation.

Referring again to FIGS. 3 and 4; when ac voltage source is normal, the power flow direction is from the ac end to the dc end of the single-phase half-bridge inverter 4. The ac voltage is converted into a dc voltage by the single-phase half-bridge inverter 4 and then injected into the second dc voltage terminal set 22 of the bi-directional dc/dc power converter 2.

Accordingly, the power flow direction is in reverse from the second dc voltage terminal set 22 to the first dc voltage terminal set 21. In this condition, the second power electronic device 32 is controlled to turn on/off, and the first power electronic device 31 is successively turned off. Thus, the output voltage of the first dc voltage terminal set 21 is half of the input dc voltage at the second dc voltage terminal set 22, and charges the power into the battery. Consequently, an additional battery charger can be reduced if the bi-directional dc/dc power converter 2 is used.

Figure 5:
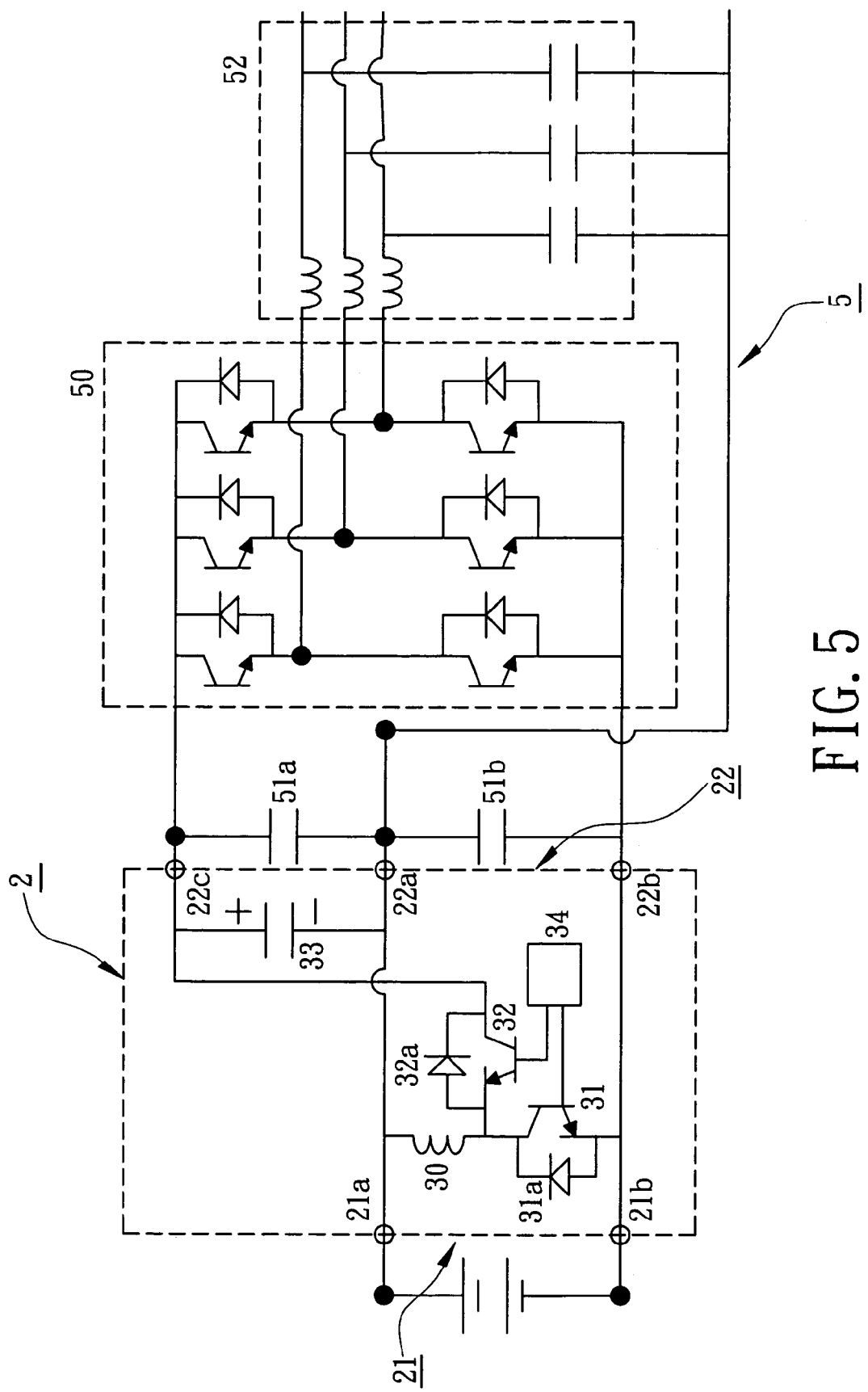
FIG. 5 is a schematic circuitry of the bi-directional dc/dc power converter having the neutral terminal applied to a three-phase four-wire inverter in accordance with the preferred embodiment of the present invention.

Turning now to FIG. 5, it illustrates a schematic circuitry of the bi-directional dc/dc power converter having the neutral terminal applied to a three-phase four-wire inverter to perform the function of parallel operation UPS in accordance with the preferred embodiment of the present invention.

Referring to FIG. 5, the three-phase four-wire inverter 5 contains a dc end and an ac end, and includes a three-phase full-bridge power converter 50 and a leg with a pair of capacitors 51a and 51b serially connected each other for supplying three-phase four-wire output purpose. The leg with a pair of capacitors 51a and 51b is used to provide a neutral terminal output.

The three-phase four-wire inverter 5 further includes a three-phase L-C low-pass filter 52 for filtering high-frequency harmonics. This three-phase full-bridge power converter 50 has the function of bi-directional power flow. The positive terminal 22c, the negative terminal 22b and the neutral terminal 22a of the second dc voltage terminal set 22 of the bi-directional dc/dc power converter 2 are correspondingly connected to the two capacitors 51a and 51b of the three-phase four-wire inverter 5. The first voltage terminal set 21 of the bi-directional dc/dc converter 2 is connected to a battery bank. The ac end of the three-phase four-wire inverter 5 is connected between an ac voltage source and a load. The power flow direction can flow from the dc end to the ac end of the three-phase four-wire inverter 5 to provide the back-up power to the load when the ac voltage source is failed. The power flow direction also can flow from the ac end to the dc end of the three-phase four-wire inverter 5 to charge the power to the battery when the ac voltage source is normal.

Referring back to FIGS. 3 and 5, when ac voltage source is failed, the power flow direction is from the dc end to the ac end of the three-phase four-wire inverter 5. The power flow of the bi-directional dc/dc power converter 2 is from the first voltage terminal set 21 to the second voltage terminal set 22. The operation of the bi-directional dc/dc power converter 2 in accordance with the preferred embodiment of the present invention, as shown in FIG. 5, has been discussed in FIGS. 2 and 3, and the detailed descriptions may be omitted. To maintain normal operation of the three-phase four-wire inverter 5, the bi-directional dc/dc power converter 2 must supply two dc voltages with the same amplitude to the two capacitors 51a and 51b of the three-phase four-wire inverter 5. The capacitor 33 of the bi-directional dc/dc power converter 2 can be incorporated into the capacitor 51a of the three-phase four-wire inverter 5 to constitute a single capacitor.

When ac voltage source is failed, the power flow direction is from the first dc voltage terminal set 21 to the second dc voltage terminal set 22. The first power electronic device 31 is controlled to turn on/off, and the second power electronic device 32 is successively turned off. When the first power electronic device 31 is turned on/off, the inductor 30 is energized by the first dc voltage terminal set 21 and then releases the energy via the second diode 32a to the capacitor 33 to provide a dc voltage thereon. Since the total voltage of the positive and negative terminals 22c, 22b of the second dc voltage terminal set 22 is equal to the voltage of the power source plus the capacitor 33, the total voltage of the positive and negative terminals 22c, 22b of the second dc voltage terminal set 22 is equal to the double voltage of the power source. Then, the neutral terminal 22a of the second dc voltage terminal set 22 divides the voltage of the positive and negative terminals 22c, 22b of the second dc voltage terminal set 22 into two dc voltages with the same amplitude. Consequently, the bi-directional dc/dc power converter 2 supplies two dc voltages with the same amplitude to the two capacitors 51a and 51b of the three-phase four-wire inverter 5 for normal operation.

When the ac voltage source is normal, the ac voltage is converted into a dc voltage and then injected into the second dc voltage terminal set 22 of the bi-directional dc/dc power converter 2. Accordingly, the power flow direction is inverted from the second dc voltage terminal set 22 to the first dc voltage terminal set 21. In this condition, the second power electronic device 32 is controlled to turn on/off, and the first power electronic device 31 is successively turned off. Thus, the output voltage of the first dc voltage terminal set 21 is half of the input dc voltage at the second dc voltage terminal set 22, and the output voltage of the first dc voltage terminal set 21 can charge the power into a battery. Consequently, an additional battery charger can be reduced if the bi-directional dc/dc power converter 2 is used.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A bi-directional dc/dc power converter, comprising:
   a first dc voltage terminal set consisting of a positive terminal and a negative terminal;
   a second dc voltage terminal set consisting of a positive terminal, a negative terminal and a neutral terminal;
   an inductor acted as an energy buffer;
   a first power electronic device connected in series with an inductor, the combination of the first power electronic device and the inductor is connected between the positive terminal and the negative terminal of the first dc voltage terminal set, turning on/off the first power electronic device is used to perform the step-up power conversion;
   a second power electronic device connected between a connected point of the first power electronic device and the inductor, and the positive terminal of the second dc voltage terminal set, turning on/off the second power electronic device is used to perform the step-down power conversion;
   a first diode connected parallel with the first power electronic device;
   a second diode connected parallel with the second power electronic device;
   a capacitor connected between the two positive terminals of the first dc voltage terminal set and the second dc voltage terminal set; and
   a controller connected to two power electronic devices to turn on/off;
   wherein the bi-directional dc/dc power converter can carry out the bi-directional power flow; when a power flow direction is from the first dc voltage terminal set to the second dc voltage terminal set, the output voltage of the bi-directional dc/dc power converter is double of the voltage at the first dc voltage terminal set; and alternatively, when the power flow direction is in reverse from the second dc voltage terminal set to the first dc voltage terminal set, the output voltage of the bi-directional dc/dc power converter is half of a voltage at the second dc voltage terminal set.

2. The bi-directional dc/dc power converter as defined in claim 1, wherein when the power flow direction is from the first dc voltage terminal set to the second dc voltage terminal set, the first power electronic device is controlled to turn on/off and the second power electronic device is not actuated to successively turn off; the inductor is energized by an input dc voltage source from the first dc voltage terminal set and then releases the energy to the capacitor via the second diode; thus, the capacitor provided with a converted output dc voltage is equal to the input dc voltage; since the voltage between the positive and negative terminals of the second dc voltage terminal set is equal to the input dc voltage plus the converted output dc voltage, the output voltage of the bi-directional dc/dc power converter is double of the input dc voltage; since the input dc voltage is equal to the voltage of the capacitor, the neutral terminal of the second dc voltage terminal set is regarded as a neutral terminal.

3. The bi-directional dc/dc power converter as defined in claim 1, wherein when the power flow direction is in reverse from the second dc voltage terminal set to the first dc voltage terminal set, the second power electronic device is controlled to turn on/off, and the first power electronic device is not actuated to successively turn off; the output voltage of the first dc voltage terminal set is controlled to be half of the input dc voltage at the second dc voltage terminal set.

4. The bi-directional dc/dc power converter as defined in claim 1, wherein the controller of the bi-directional dc/dc power converter includes a first voltage detector, a second voltage detector, a first subtractor, a second subtractor, a first controller, a second controller, a first switch, a second switch, a pulse width modulation circuit, a first driver circuit and a second driver circuit.

5. The bi-directional dc/dc power converter as defined in claim 4, wherein the first voltage detector and the second voltage detector are used to correspondingly detect voltages of the first dc voltage terminal set and the capacitor.

6. The bi-directional dc/dc power converter as defined in claim 4, wherein the controller further includes a high-frequency triangular wave generator used to generate a high-frequency triangular wave signal, and send it to the pulse width modulation circuit to act as a carrier signal.

7. The bi-directional dc/dc power converter as defined in claim 1, wherein the bi-directional dc/dc power converter is applied to a single-phase half-bridge inverter; the positive terminal, the negative terminal and the neutral terminal of the second dc voltage terminal set are connected to a dc end of the single-phase half-bridge inverter; the power flow of the bi-directional dc/dc power converter and the single-phase half-bridge inverter is controlled to be bi-directional; an ac voltage source is connected to the ac end of single-phase half-bridge inverter, the ac power is converted into dc power to the second voltage terminal set of the bi-directional dc/dc power converter by single-phase half-bridge inverter, and, consequently, performs step-down conversion by the bi-directional dc/dc power converter to a half voltage at the first dc voltage terminal set of the bi-directional dc/dc power converter and provides the power into an apparatus connected to the first dc voltage terminal set; on the contrary, a dc voltage source is connected to the second dc voltage terminal set of the bi-directional dc/dc power converter, and the bi-directional dc/dc power converter performs step-up power conversion, the first dc voltage terminal set of the bi-directional dc/dc power converter supplies two dc voltages with the same amplitude to the two capacitors of the single-phase half-bridge inverter for converting into a single-phase ac power to provide to the load.

8. The bi-directional dc/dc power converter as defined in claim 1, wherein the bi-directional dc/dc power converter is applied to a three-wave four-wire inverter; the power flow of the bi-directional dc/dc power converter and the three-wave four-wire inverter is controlled to be bi-directional; an ac voltage source is connected to the ac end of the three-wave four-wire inverter, the ac power is converted into dc power to the second voltage terminal set of the bi-directional dc/dc power converter by the single-phase half-bridge inverter, and, consequently, the bi-directional dc/dc power converter performs step-down power conversion to supply a half output voltage at the first dc voltage terminal set and provides the power into an apparatus connected to the first dc voltage terminal set; on the contrary, a dc voltage source is connected to the second dc voltage terminal set of the bi-directional dc/dc power converter, and the bi-directional dc/dc power converter performs step-up power conversion, the first dc voltage terminal set of the bi-directional dc/dc power converter supplies two dc voltages with the same amplitude to the two capacitors of the three-wave four-wire inverter for converting into a three-wave four-wire ac power to provide to the load.

* * * * *